United States Patent [19]
Gfeller

[11] Patent Number: 5,808,760
[45] Date of Patent: Sep. 15, 1998

[54] WIRELESS OPTICAL COMMUNICATION SYSTEM WITH ADAPTIVE DATA RATES AND/OR ADAPTIVE LEVELS OF OPTICAL POWER

[75] Inventor: Fritz Gfeller, Rueschlikon, Switzerland

[73] Assignee: International Business Machines Corporation, Armonk, N.Y.

[21] Appl. No.: 704,523

[22] PCT Filed: Apr. 18, 1994

[86] PCT No.: PCT/EP94/01196

§ 371 Date: Sep. 3, 1996

§ 102(e) Date: Sep. 3, 1996

[87] PCT Pub. No.: WO95/28777

PCT Pub. Date: Oct. 26, 1995

[51] Int. Cl.[6] .................................................. H04B 10/08
[52] U.S. Cl. ..................... 359/110; 359/172; 340/825.72; 371/20.1
[58] Field of Search ...................... 359/110, 152, 359/154, 143, 161, 172, 187; 340/825.72; 370/277; 371/20–21

[56] References Cited

U.S. PATENT DOCUMENTS 5,623,355  4/1997  Olsen ......................................... 359/110
5,652,668  7/1997  Aulet et al. .............................. 359/110

FOREIGN PATENT DOCUMENTS 2-042833  2/1990  Japan .

*Primary Examiner*—Knife-Michael Negash
*Attorney, Agent, or Firm*—John D. Flynn

[57] ABSTRACT

The wireless optical (in particular infrared) communication system with at least one transmitter (75) and one receiver (76) comprises control means (77, 78), which dynamically adapt the data rate and/or the optical power of the transmitter in dependence of signal-to-noise ratio of the receiver. Due to this adjustment, optimized system performance is maintained even under the influence of ambient light which statistically changes the signal-to-noise ratio of the receiver. The best compromise between data rate, bit error rate and transmission range is dynamically determined. The control function is distributed between transmitting and receiving system unit. The control information is communicated via wireless optical communication.

21 Claims, 8 Drawing Sheets

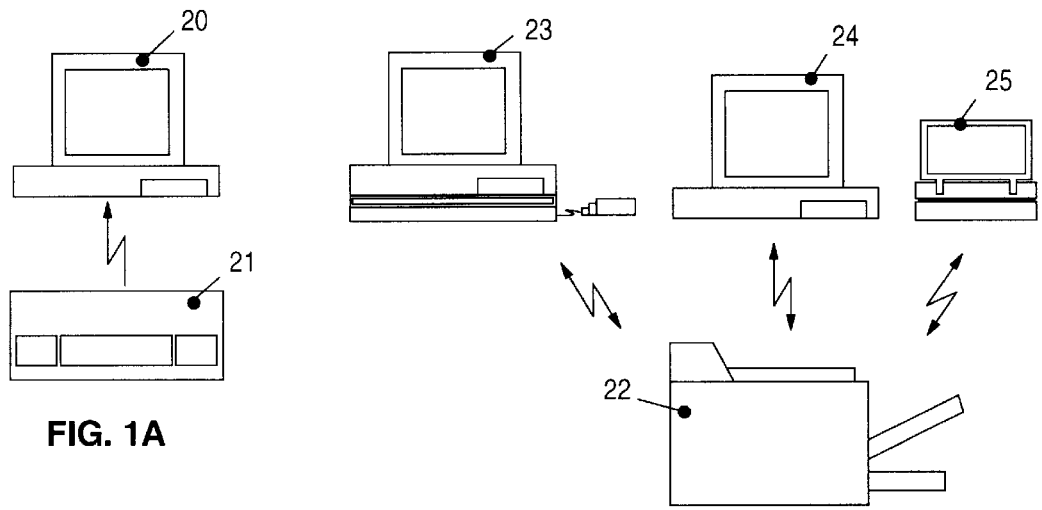
FIG. 1A
FIG. 1B
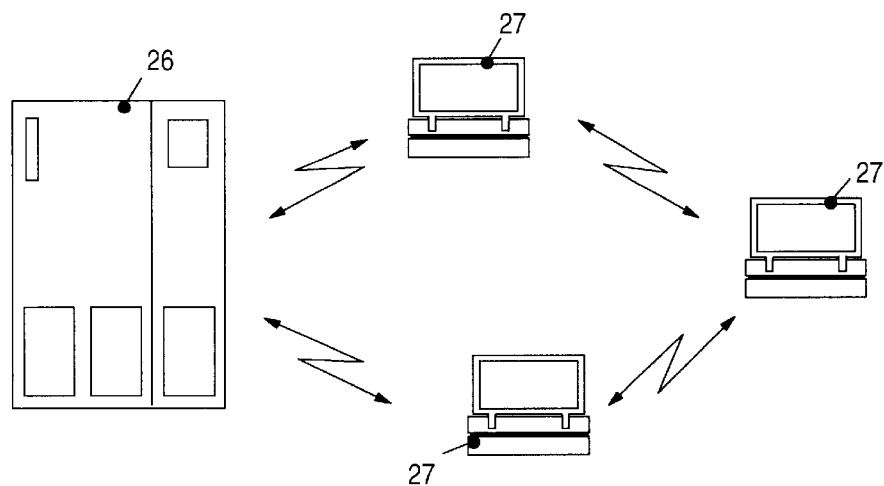
FIG. 1C
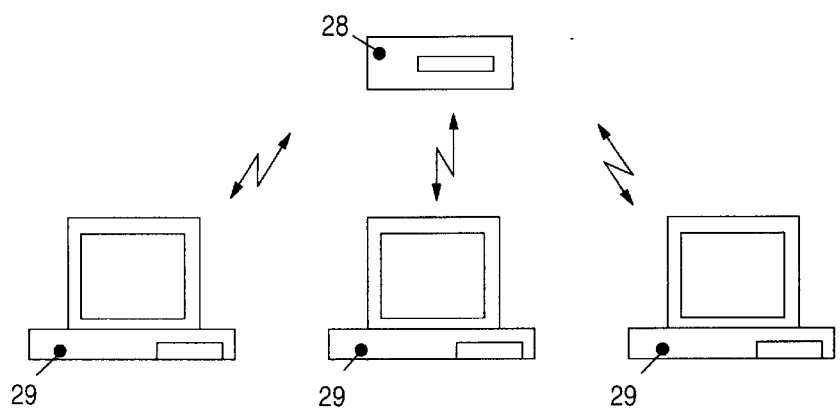
FIG. 1D

WIRELESS OPTICAL COMMUNICATION SYSTEM WITH ADAPTIVE DATA RATES AND/OR ADAPTIVE LEVELS OF OPTICAL POWER

TECHNICAL FIELD

The present invention relates to a wireless optical communication system for data transmission.

BACKGROUND OF THE INVENTION

With the rapidly increasing number of workstations and personal computers (e.g. desktop or handheld ones) in all areas of business, administration, fabrication etc., there is also an increasing demand for flexible and simple interconnection of these systems. There is a similar need as far as the hook-up and interconnection of peripheral devices, such as keyboards, computer mice, printers, plotters, scanners, displays etc., is concerned. The use of electrical interconnects becomes a problem with increasing number of systems communicating with each other, and in many cases in which the location of systems, or the configuration of subsystems, must be changed frequently. It is therefore desirable to gain flexibility and thus to eliminate electrical interconnects for such systems and to use wireless communication instead.

The use of optical signals for wireless transfer of digital data between systems and devices has received increased interest during recent years and has lead to applications in commercial products. One example is the optical remote control of electronic instruments. In the Patent Abstract of Japan of the Japanese Patent JP-A 5145975, No. 535 (E-1439), a conventional remote control system is disclosed. This remote control determines the amount of ambient light and sends out stronger signals if the ambient light level is high. If the ambient light level is low, it transmits signals with reduced power. Another example is the communication between information systems in an office environment. Digital data to be transferred between a transmitting system and a receiving system are transformed to modulated optical signals which are radiated from a light source—in particular an infrared (IR) one—at the location of the transmitting system and are received and converted to electrical signals and then to digital data by the receiving system. In the Patent Abstract of Japan of the Japanese Patent JP-A 4256234, No. 35 (E-1310), an optical transmission system is disclosed. It comprises a receiver and transmitter being connected via feedback means. These feedback means are employed to control the level of input current driving the light sources on the transmitter side. I.e., the system disclosed is a communication system where the output power of the transmitter is controlled and adjusted to ensure that the burden of the light sources is reduced. The optical signals might directly propagate to the optical receiver of the receiving system or they might indirectly reach the receivers after changes of the direction of propagation due to processes like reflections or scattering at surfaces. Today, the former case is realized in docking stations for portable computers where the data transfer takes place between an optical transmitter and a receiver which are close together at a distance on the scale of cm and properly aligned. The latter case is typical for applications in an office environment in which undisturbed direct transmission of optical signals between transmitters and receivers several meters away from each other is unpractical or even impossible due to unavoidable perturbations of the direct path. One known approach to achieve a high degree of flexibility is to radiate optical signals from the transmitting system to the ceiling of an office where they are reflected or diffusely scattered. Thus, the radiation is distributed over a certain zone in the surroundings of the transmitter. The distribution of the light signals spreading from the ceiling depends on many details which are characteristic for the particular environment under consideration. However, essential in this context is mainly that the transmission range, i.e. the distance between transmitting system and receiving system, is limited to some final value, hereafter called the transmission range, since the energy flux of the transmitted radiation decreases with increasing distance of propagation and the receiver sensitivity is limited due to a final signal-to-noise ratio. Typical known systems, operating at levels of optical power which are limited by the performance of the light sources and safety requirements for light exposure, have demonstrated transmission ranges of several meters for data rates of 1 Mbps.

The latter example illustrates basic features of wireless optical communication and indicates fields of applications where it is favorably applied in contrast to another competitive method of wireless communication, the radio frequency (RF) transmission. Wireless optical communication allows data transmission which is short range, whereas RF transmission is potentially long range. Furthermore optical wireless communication in an office environment is localized since typical boundaries of an office such as walls and ceilings are not transparent for light but for RF waves. That is why possible interferences between different communication systems are easier to control and a simpler way for achieving data security is possible for a wireless communication system which is based on optical radiation rather than RF transmission. RF transmission is even restricted by communications regulations and licenses whereas optical wireless communication systems are not.

Crucial parameters of a wireless optical communication system are the achievable data rate and the distance between the systems exchanging data. In an office environment, it can be necessary to communicate data over distances exceeding the transmission range of a single optical transmitter. However, the transmission range of a single optical transmitter can be extended within the concept of wireless communication, for example by introducing optical repeaters. One example of such an extended system has been proposed in U.S. Pat. No. 4,402,090 entitled "Communication System in which Data are Transferred Between Terminal Stations and Satellite Stations by Infrared Systems". In this patent, a system is described which provides a plurality of satellite stations, i. e. stations usually fixed at the ceiling of a large room. Terminals can optically interact with satellites within their transmission range, and data can be distributed via intersatellite communication thus enabling the distribution of data over distances beyond the transmission range of a single transmitter.

When designing a wireless optical communication system, one has to be aware of unavoidable ambient light, such as daylight or light from lamps, which always reaches the optical detectors, unless the system is restricted for the use in a completely dark environment. Unavoidable ambient light can lead to time-dependend signals, for example AC signals from lamps, and is an important, in many practical cases the dominant source of noise in the optical receiver. Thus, ambient light influences the signal-to-noise ratio of the receiver and, therefore, affects the transmission range. The appearance of unavoidable light is mostly statistical and often difficult to control and its intensity can drastically change, as it is apparent for sunlight or lamps being switched on/off. A further realistic effect which statistically affects the signal-to-noise ratio and thus the transmission range is the occurrence of optical path obstructions influencing the receiver signal. In an office environment for example, moving users can change the strength of the transmitted signals and the influence of unavoidable ambient light as well.

In present wireless communication systems, first obvious attempts have been made to handle the ambient-light problem. Usually, low frequency ($\leq 500$ KHz) AC signals, which can be attributed to common room illumination, are suppressed with electrical filters after the conversion of light to electrical signals. Optical filters are used to restrict the spectrum of undesired ambient light. However, a significant portion of daylight is spectrally in the same range as the optical radiation of the light sources appropriate for wireless communication systems.

Present optical wireless communications systems which are designed for applications in the presence of ambient light work with fixed data rates and and optimization schemes. Today's systems, which operate at a fixed transmission rate, offer the desired degree of data security only at the expense of a reduction of the transmission range which corresponds to security margins taking the influence of ambient light into account. For today's systems, these security margins must be determined in trial-and-error experiments, individually for each particular configuration in each particular environment. Systems offering automatic control and optimization of performance in the presence of ambient light are not known.

SUMMARY OF THE INVENTION

It is an object of this invention to provide a wireless optical communication system which comprises at least one transmitting and one receiving unit for optical signals and is suited for operation under the condition that the optical receiver is exposed to unavoidable ambient light, which deteriorates the receiver sensitivity. It is assumed that the exposure might statistically change with time.

It is another object of this invention to provide a method and an apparatus for optimizing the system performance under consideration of dynamically changing exposures to ambient light.

The invention as claimed is intended to meet these objectives. It provides a method and an apparatus for improved wireless optical communication. The improvement is achieved by introducing the optical power of the transmitting unit and/or the data rate as adaptable parameters, thus offering a useful extra degree of freedom and more flexibility in the design of wireless optical communication systems. Furthermore, the optical power of a transmitting system and the data rate are parameters which can be set under automatic control. Such control can be achieved with many different means. A few examples of such control means are cited in claims 1 to 12 and in the description of the invention. In addition, said parameters can be fixed values of optical power. In the Patent Abstract of Japan of the Japanese Patent JP-A 2042833, No. 200 (E-0920), an optical communication system is disclosed. This system is characterized in that its transmitter portion emits light at high output power if frequent bit errors are detected. If there are no bit errors or if the number of bit errors is low, the output power of the transmitter portion is reduced such that the energy consumption is minimized. No case study is known which gives an analysis of how the trade-off between data rate and distance between the transmitting and the receiving part of the system is influenced by ambient light in a variety of situations representative for an office environment. Since these trade-offs have not yet been studied for such systems, the benefit of control and optimization schemes which allow the dynamic optimization of wireless optical communication systems exposed to changing levels of ambient light with respect to transmission rate, transmission range and transmission security (bit error rate) has not been recognized. Therefore, no attempt has been made to introduce such control and optimization schemes. Today's systems, which operate at a fixed transmission rate, offer the desired degree of data security only at the expense of a reduction of the transmission range which corresponds to security margins taking the influence of ambient light into account. For today's systems these security margins must be determined in trial-and-error experiments individually for each particular configuration in each particular environment. Systems offering automatic control and optimization of performance in the presence of ambient light are not known.

SUMMARY OF THE INVENTION

It is an object of this invention to provide a wireless optical communication system which comprises at least one transmitting and one receiving unit for optical signals and is suited for operation under the condition that the optical receiver is exposed to unavoidable ambient light, which deteriorates the receiver sensitivity. It is assumed that the exposure might statistically change with time.

It is another object of this invention to provide a method and an apparatus for optimizing the system performance under consideration of dynamically changing exposures to ambient light.

The invention as claimed is intended to meet these objectives. It provides a method and an apparatus for improved wireless optical communication. The improvement is achieved by introducing the optical power of the transmitting unit and/or the data rate as adaptable parameters, thus offering a useful extra degree of freedom and more flexibility in the design of wireless optical communication systems. Furthermore, the optical power of a transmitting system and the data rate are parameters which can be set under automatic control. Such control can be achieved with many different means. In addition, said parameters can be adapted automatically if required. This application is adequate for systems which are exposed to fluctuating ambient light. For example, taking the bit error rate as the main criterion, the data rate can always be dynamically adapted to its momentary upper limit depending on the exposure to ambient light.

In conclusion, this invention provides a method and an apparatus for improved wireless optical communication. The improvement is achieved by introducing automatic control means for the optical power of a transmitting unit and/or the data rate.

Advantages achievable with this invention are:

enhanced flexibility in system design;

simplification of integration of systems operating with different data rates;

dynamic performance optimization;

controlled bit error rates and thus data security even for adverse exposure to ambient light.

DESCRIPTION OF THE DRAWINGS AND NOTATIONS USED

The invention is described in detail below with reference to the following drawings:

FIG. 1A shows a wireless IR link between a computer and a keyboard.

FIG. 1B shows a wireless IR network, sometimes called LAN on a table, interconnecting different computers and terminals as well as peripheral devices (e.g. a printer).

FIG. 1C shows a wireless IR network with ring topology, called intra Office LAN, interconnecting different computers and a mainframe.

FIG. 1D shows part of a wireless IR network with a repeater situated at the ceiling, called Intra Office LAN with repeater, usually employed in open area offices, conference rooms, or factory halls.

DETAILED DESCRIPTION

Figure 2A:
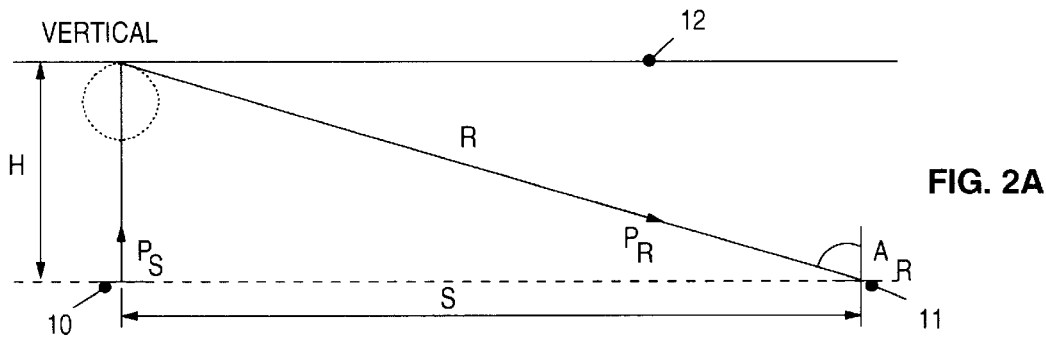
FIG. 2 shows three configurations of a transmitter/receiver pair considered as model systems for wireless optical intraoffice communication.

In general, a system for wireless optical communication comprises at least one unit serving as transmitter and a second one serving as receiver, the transmitter comprising a light source, such as a light emitting diode (LED) or a laser diode, and the receiver comprising a photodiode. The word unit is hereinafter used as a synonym for all kinds of computers, terminals, repeaters, peripheral devices etc., which might communicate with each other, either unidirectional or bidirectional. Normally, infrared (IR) light is used for wireless optical communication although the results presented in the following are not restricted to a specific range of the light spectrum.

FIG. 1 shows four examples for applications of wireless optical communication in an office environment, one basic transmitter/receiver configuration for direct IR communication and three configurations for indirect IR communication.

Direct transmitter/receiver coupling is well suited for applications where only two, or just a few, units use the same IR channel. An example is illustrated in FIG. 1A. In this Figure, a first unit, for example a keyboard 21, is coupled to a second unit, a computer 20. This kind of wireless IR link might be unidirectional and the maximum distance is usually less than 1 meter. The direct line-of-sight path between these two units has to be obstruction-free to facilitate reliable operation.

A wireless IR network, sometimes called LAN on a table, is illustrated in FIG. 1B. As shown in this Figure, three different units are linked to a fourth one. In the present example, two computers 23 and 25 and a terminal 24 are linked to a printer 22. Direct as well as indirect configurations are suitable for these kind of applications.

In FIG. 1C, a wireless IR network with ring topology, called Intra Office LAN is shown. This IR network interconnects three computers 27 with a mainframe machine 26. Usually indirect configurations are better suited for Intra Office IR networks.

Another exemplary IR network configuration is shown in FIG. 1D. A first unit, e.g. a repeater 28, is situated at the ceiling in order to be able to communicate with remote units. In the present example the remote units are computers 29. Such a configuration is usually called Intra Office LAN with repeater, and might be employed in open area offices, conference rooms, and factory halls.

In the following an evaluation of the performance limits of wireless optical communication systems is presented. For the sake of simplicity three different configurations of a single transmitter/receiver pair are considered, a vertical transmitter/receiver configuration, a tilted transmitter/receiver configuration and a spotlight transmitter/receiver configuration (see FIG. 2). As the following analyses show, these three examples have similar performance characteristics which differ only slightly. Thus these examples are considered as representative models. As measures of their performance, the data rate, the bit error rate and the distance between transmitter and receiver are taken. In a first step, the trade-offs between these parameters are derived from analyses of the signal-to-noise ratio and a calculation of the probability for the occurrence of a bit error (bit error rate). In a second step, the influence of ambient light is included. On this basis optimization schemes are discussed.

The formulae given in the following sections provide a reasonable approximation of the power received at the photodiode as a function of the distance between the transmitter 10 and the receiver 11. It is assumed that the transmitter emits a narrow parallel beam which is reflected at the ceiling or a similar surface as a diffuse (Lambertian) point source. The signal power incident on the photodiode is then given as the radiation contained in the solid angle bounded by the projected photodiode area. It is assumed that the path of the propagating light is not obstructed. The following parameters are used:

| | |
|---|---|
| $P_s$ = 1 Watt | average optical power of the transmitter |
| $A_r$ = 1 cm$^2$ | photodiode area |
| H = 1.8 m | height of ceiling above desk top |
| $\rho$ = 0.7 | reflection coefficient of ceiling |
| S = 0–20 m | distance between transmitter and receiver |

Vertical Transmitter/receiver Configuration

Figure 2B:
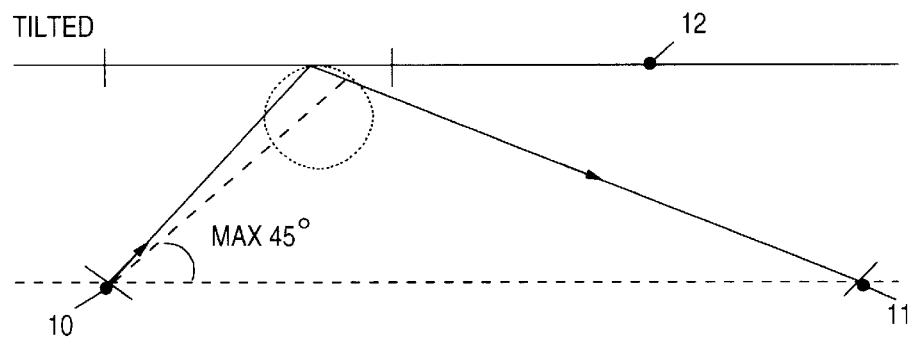
Figure 2C:
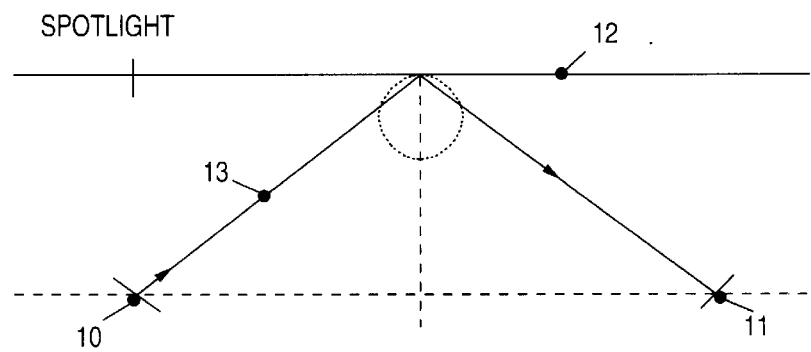

This first indirect configuration, illustrated in FIG. 2A, is characterized in that the LED of the transmitter and the photodiode of the receiver point upward and normal to the ceiling of a room. This configuration does not need alignment of the transmitter and receiver, but produces a 4th-power signal attenuation with distance S, S being the distance between the transmitter and the receiver. The received signal power is approximately given by $$P_r = \rho P_s \frac{A_r}{R^2 \pi} \cos^2\gamma = \rho P_s A_r \frac{H^2}{\pi (H^2 + S^2)^2} \qquad (1)$$

It has been experimentally found that formula (1) underestimates the power levels with increasing distance S. An approximate correction can be made by multiplying equation (1) with a correction factor. This correction is necessary since multiple reflections have not been taken into account.

Tilted Transmitter/receiver Configuration

This configuration (see FIG. 2B) requires that the LEDs of all transmitters and the photodiodes of the receivers are approximately directed towards the center of the ceiling of the room. In practice, it suffices that remote transmitters and receivers located at the periphery of the transmission range are tilted by approximately 45° and face the office interior, whereas other transmitters and receivers located at the center are pointing upward. The advantages of the tilted configuration are:

1. The signal power is spread more uniformly thus allowing a greater transmission range.
2. In most cases, direct exposure to sunlight or desk lamps can be avoided.
3. Transmitters and/or receivers located at the periphery can in many cases benefit from a direct line-of-sight path thus increasing the power efficiency.

However, this approach requires a flexible integration of the transmitter and receiver into the unit's housing. In case of a tilted configuration the received signal power is approximated by the expression $$P_r = \rho P_s A_r \frac{H}{\{H^2 + [S - H(1 - e^{-S/H})]^2\}^{\frac{3}{2}}}. \quad (2)$$

Spotlight Transmitter/receiver Configuration

This particular configuration is characterized in that, in addition to the common alignment of all transmitters and receivers, a colliminated narrow LED beam is required, allowing the reflected spot to appear at the intersection of the LED axis with the ceiling. The reflected diffuse point source therefore appears halfway between the most distant transmitter/receiver pair, resulting in the smallest propagation loss. The corresponding expression for the received signal power $P_r$ is then $$P_r = \rho P_s \frac{A_r}{R^2 \pi} \cos\gamma = \rho P_s A_r \frac{8H}{\pi (4H^2 + S^2)^{\frac{3}{2}}} \quad (3)$$

Since LEDs with small beam angles are neither easily produced nor commercially available, other light sources with small half-power angles are required. A colliminated laser source, for example, could satisfy the above conditions. The resulting narrow field-of-view would also allow the use of large aperture lenses with considerable optical gain, as well as narrow optical bandpass filters to suppress the undesired ambient light outside the spectrum of the optical signal source. It is a disadvantage of this concept that the complicated alignment procedure is not suited for user-friendly mobile applications. Note that, when herein referring to optical signal sources, all different kinds of diodes, including the conventional LEDs as well as laser diodes, are meant.

Figure 3:
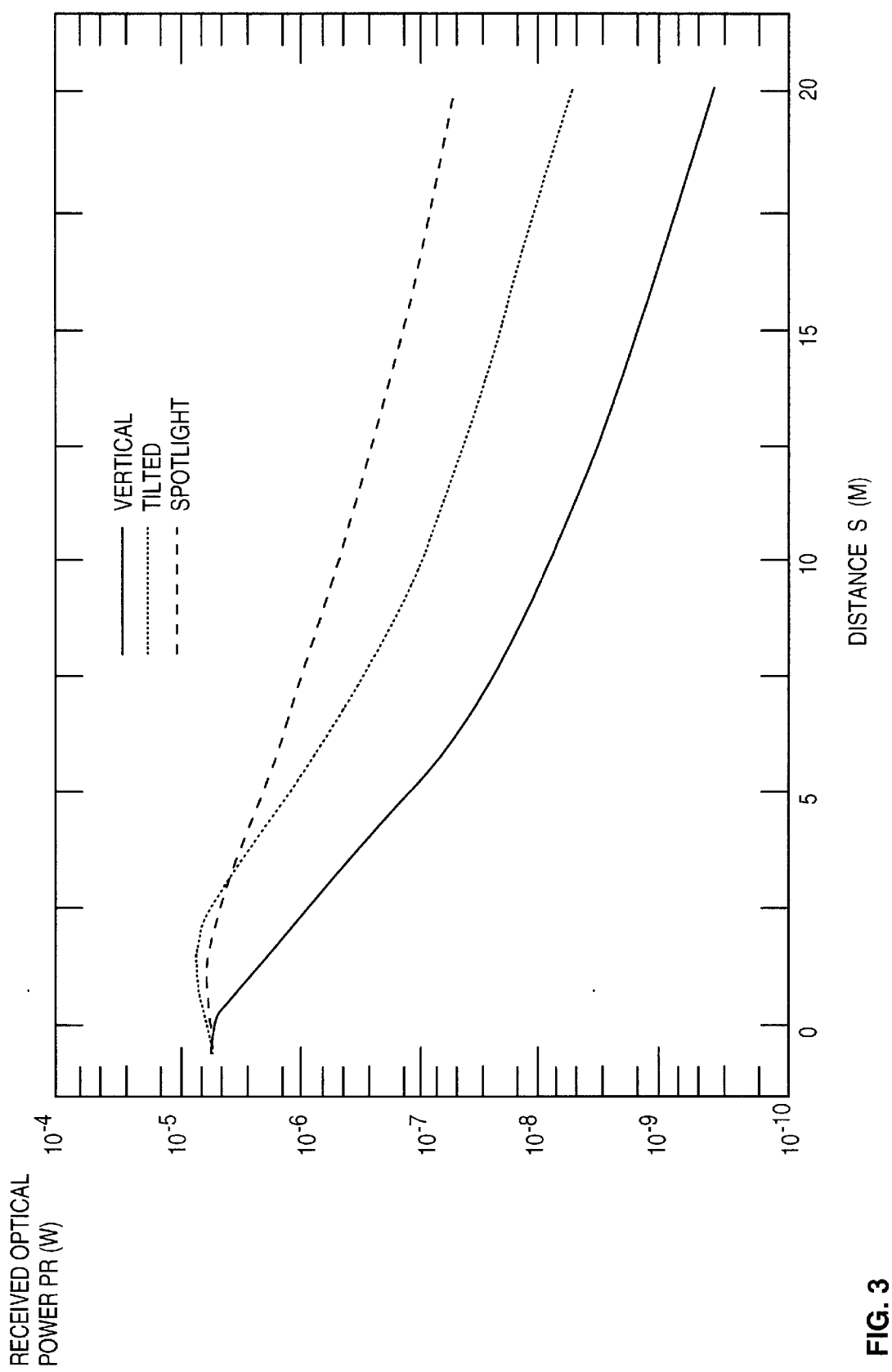
FIG. 3 illustrates the received optical power plotted against the distance S between a transmitter and receiver, for the three different transmitter/receiver configurations illustrated in FIG. 2.

In FIG. 3, the received optical power $P_r$ is plotted against distance S for the three basic indirect transmitter/receiver configurations addressed above. The diagram in FIG. 3 is based on the assumption that the source power $P_s$=1 W and the photodiode area $A_r$=1 cm². In addition, the transmitter is assumed to be located at the position S=0, whereas the receiver is moved a distance S.

From Equations (1)–(3) the receiver signals can be obtained for each configuration. In the following these results are related to the receiver noise and subsequently converted to the bit error probability $P_e$ as a function of distance S. At this point the influence of the ambient light environment can be taken into account as contribution to the shot noise of the receiver. A simple model is assumed that estimates the bit error probability $P_e$ as a function of the distance S and the shot noise generated by different ambient light environments. The following parameters are used in addition to the Boltzmann constant k, the absolute temperature T, and the electron charge e:

| | |
|---|---|
| η = 0.5 A/W | photodiode efficiency |
| $R_1$ = 1 kΩ | photodiode bias resistor |

The mean square noise current is given by $$\overline{i_n^2} = \frac{4kTB}{R_1} + 2eI_bB \quad (4)$$

where B is the electrical bandwidth of the receiver, and $I_b$ the photodiode bias current due to imperfect optical filtering of the ambient light. The first noise term represents a thermal noise floor (preamplifier noise assumed included) which is present at all times. Note that due to the assumed low 1 kΩ value (to prevent excessive photodiode bias voltages) the noise floor is rather high. In practice, lower noise levels can be realized, resulting in improved transmission distances for fluorescent environments. The shot noise term depends on the ambient light level passing an optical filter situated in front of the receiving photodiode. Different kinds of optical filters, if any, such as optical interference filters or absorption filters, might be used.

We assume the transmission of a binary data stream consisting of a sequence of symbols, either "0" or "1", each symbol denoting one bit of information, the "1" being represented by a single optical pulse of duration $T_p$ and the "0" being represented by the lack of a signal during the time span $T_p$. For this particular coding scheme, the time per transmitted bit, $T_b$, is equal to $T_p$, and the data rate of the transmission generally defined as bit rate $R_b$=1/$T_b$, i. e. the momentary speed at which the bits of information are transmitted and recognized as "0" or "1" by the receiver, is equal to $R_b$=1/$T_p$.

In order to assure that the receiver transmits a single pulse without significant distortion but suppresses noise as good as possible, we assume the relation $$B = 1/T_b = R_b \quad (5)$$

for the bandwidth B of the receiver. The mean signal current is related to the received signal power $P_r$ through $$\overline{i_s} = P_r \eta \quad (6)$$

and the signal-to-noise (S/N) ratio is defined by $$\alpha = \frac{\overline{i_s}}{\overline{i_n}} \quad (7)$$

Figure 4:
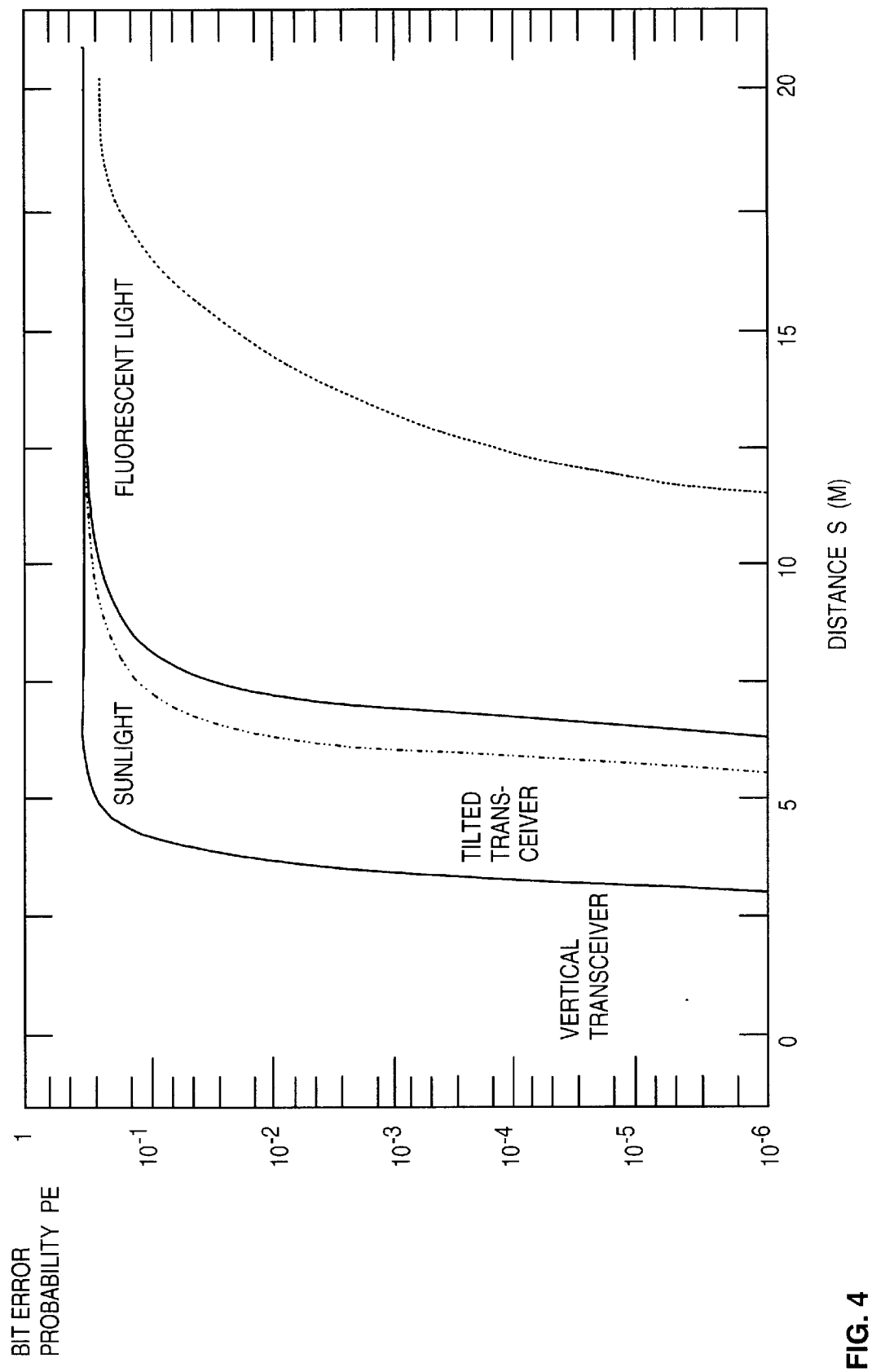
FIG. 4 illustrates some examples of the bit error probability $P_e$ versus distance S between receiver and transmitter.

The bit error probability for binary transmission and white Gaussian noise is given by the error function which is herein approximated with $$P_e \leq \frac{1}{2} e^{-\frac{\alpha^2}{2}} \quad (8)$$

to gain a simple analytical expression which, however, overestimates the bit error probability. In FIG. 4 some examples of the bit error rate $P_e$ versus distance S are shown which illustrate the existence of a well defined communication cutoff distance for a given ambient light environment. FIG. 4 holds for the data rate $R_b$=1 Mbps. As ambient light environment, exposure by full sunlight (full lines) and light of fluorescent lamps (dashed-dotted lines) has been chosen.

The probability of at most m errors occurring in a data packet containing n bits (assuming independent bit errors) is given by the cumulative binominal distribution $$p_m = \sum_{j=0}^{m} \binom{n}{j} P_e^j (1-P_e)^{n-j}. \tag{9}$$

To estimate the data throughput, i. e. the average speed of the transmission of data excluding overhead such as address information, idle bits etc., we assume a "Stop and Wait Automatic Repeat Request (ARQ)" transmission procedure. With m=0 (zero errors occurring in the packet) the relative data throughput, which is normalized with respect to the maximum data rate $R_{max}$, a design parameter of the system, is given by $$T_o = \frac{R_b}{R_{max}} (1-P_e)^n \frac{d}{n+p+i} \tag{10}$$

We wish to analyze Equation (10) for the parameters $R_{max}$=10 Mbps or 1 Mbps
$R_b$=10 Mbps, 1 Mbps, 0.1 Mbps, 0.01 Mbps

| | |
|---|---|
| d = 1024 | number of data bits per packet |
| n = 1064 | number of total bits per packet, including addresses and CRC (cyclic redundancy check) |
| p = 16 | number of preamble bits in a packet |
| i = 72 | number of idle bit intervals between packets |

For this particular example, the maximum throughput (at $R_b=R_{max}$) is 0.889 due to the assumed ratio of payload to overhead.

Figure 5:
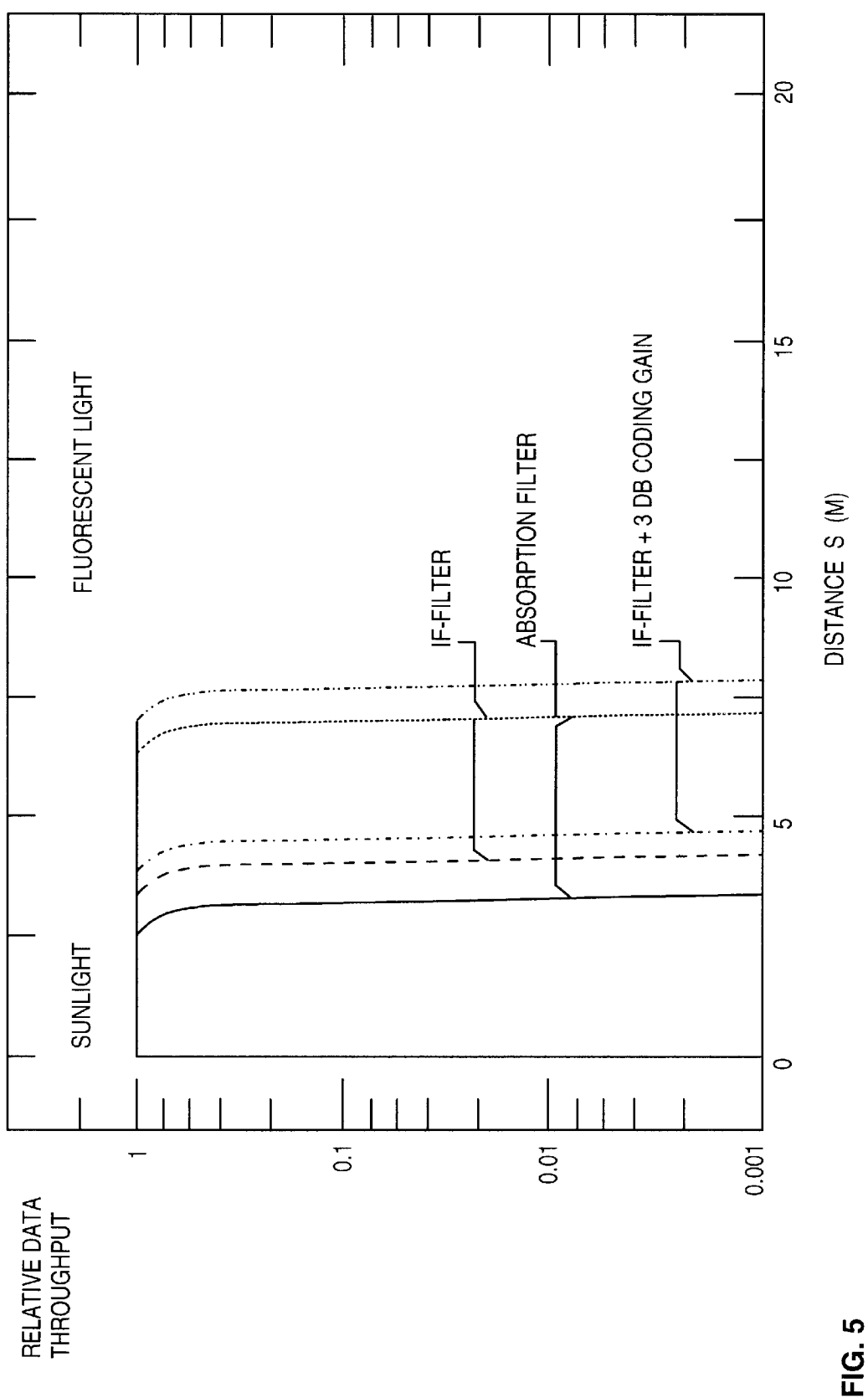
FIG. 5 illustrates estimated relative data throughput $T_o$ versus distance S, for a vertical transmitter/receiver configuration, using different improvement schemes.

The estimated data throughputs $T_o$ versus distance S for vertical transmitter/receiver alignment using the following four known exemplary improvement schemes are illustrated in FIG. 5. As an example the data rate $R_b=R_{max}$=1 Mbps has been considered.

Optical Absorption Filter (Standard Version)

The transmission limit in direct sunlight is given by the filled area in FIG. 5 and amounts to only 2.5 to 3 meters. A similar limit has been verified with measurements of conventional IR systems. The range in a fluorescent light environment is indicated by the thin solid line ($\simeq$7 m).

Optical Interference (IF) Filter with Optical
Bandwidth Corresponding to the Width of a
Typical LED Emission Spectrum ($\delta\lambda \simeq$50 nm)

The range improvement is shown with the heavy and thin dashed lines for direct sunlight and fluorescent light, respectively. The improvement is about 0.5 meters for direct sunlight. Since fluorescent light contains only little IR-radiation, nearly no improvement can be gained in this case.

Error Correction Encoding

The use of an error correction code allows a limited number of corrupted bits to be restored which is equivalent to allowing a smaller signal level for a given noise level (coding gain). This gain might be used to improve the transmission range somewhat. For a commercially available Reed-Solomon Encoder/Decoder chip set a coding gain of 3 dB was assumed. The combined effect of the IF-filter and the coding gain is shown with the dashed-dotted lines providing a range improvement of $\simeq$1 meter.

Variable Packet Sizes

Transmitting very short packets improves the probability of receiving uncorrupted messages for a given bit error probability. However, as found by carrying out different measurements, the range improvement is negligible.

Figure 6:
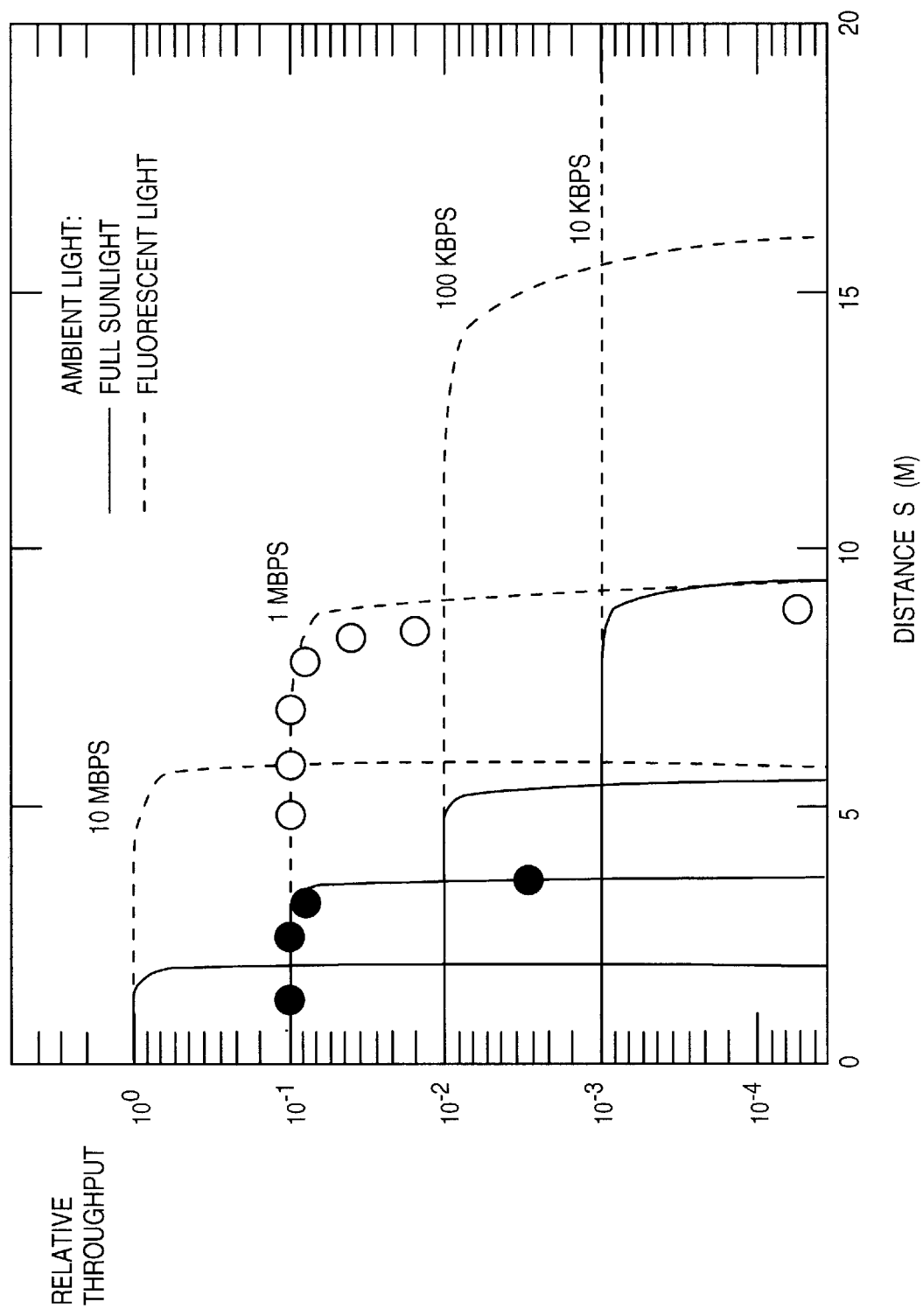
FIG. 6 illustrates the attainable transmission ranges for four different data rates (0.01 Mbps–10 Mbps).

In FIG. 6 the attainable transmission ranges for a tilted transmitter/receiver configuration are estimated for four different data rates (0.01 Mbps–10 Mbps). With 0.1 Mbps a transmission range of up to 10 meters can be achieved with the transmitters and receivers exposed to direct sunlight, as illustrated in FIG. 6. The open and full circles in FIG. 6 represent experimental values.

From FIG. 5 and FIG. 6, general design criteria for wireless optical communication systems which operate with optimized performance in an ambient light environment can be deduced. The transmission range of a system working with 10 Mbps is limited to roughly 2 m if typical extreme cases for exposures to ambient light are considered. On the other hand, perfect (error free) transmission over 'long' distances ($\simeq$10 m) requires an extremely low data rate (10 kbps). Therefore, practical applications of wireless optical communication systems are rather limited if they are operated at a fixed data rate. Such systems are either fast and short-range or slow and long-range. However, today's applications require more design flexibility. Unfortunately, the conventional improvement schemes mentioned above can only compensate a negligible portion of the effect which can be attributed to ambient light.

In accordance with this invention, the desired gain in design flexibility can be achieved by using the data rate and the optical power of the transmitter as adaptable parameters and introducing control means for their control. Automation of this control procedure allows for dynamic optimization in the sense that the best compromise between data rate and transmission range can always be found for a predefined bit error rate.

The control of the optical power and the data rate are related to the control of the signal-to-noise ratio of the receiver. The optical power of the transmitter influences the signal of the receiver. However, the maximum data rate corresponds to the smallest signal-to-noise ratio which is compatible with a predefined bit error rate and, therefore, to the signal bandwidth of the receiver. Therefore, a method which changes the data rate corresponds to a method which changes the suppression of noise with respect to the signal.

Methods influencing optical power and/or data rates are known. The power of the light source of the transmitter can be influenced by the drive current which can be automatically controlled by means which are state of the art.

Alternatively, light modulators could be used. Examples for such devices are electrooptic modulators, based on electroabsorption or electrorefraction. From the signal-to-noise point of view, it is favorable to operate the light source at the highest power level which is limited by the device performance and safety requirements. The data rate is basically defined by the chosen coding scheme and the time per pulse $T_p$. The control of the data rate has two aspects, namely, how to influence the data rate and how to communicate the information about the proper data rate between transmitter and receiver, i.e. how to synchronize transmitter and receiver. As far as methods affecting the data rate are concerned, a change of $T_p$ relates to a modification of the electrical bandwidth B of the receiver and thus to a change of the receiver's noise. B can be controlled with an adjustable electrical filter. Such devices are known. One example of how to influence the data rate via a particular coding scheme even for a constant time per bit $T_b$ and a constant time per pulse $T_p$ is the multiple transmission of redundant information. In this case individual symbols of the code, each related to a time frame of a given duration $T_2$ and each representing a certain number of bits, are transmitted m times, m being an integer. This multiple transmission reduces the data rate by 1/m, but enables the application of noise suppression procedures such as signal averaging, leading to an improvement of the signal-to-noise ratio of the receiver by roughly a factor $1/\sqrt{m}$, even if the electrical bandwidth of the receiver is left unchanged. This example and additional concepts for the adjustment of data rates are discussed below in the context with an embodiment in accordance with this invention. A realization of the transmitter/receiver synchronization is also given there.

Figure 7A:
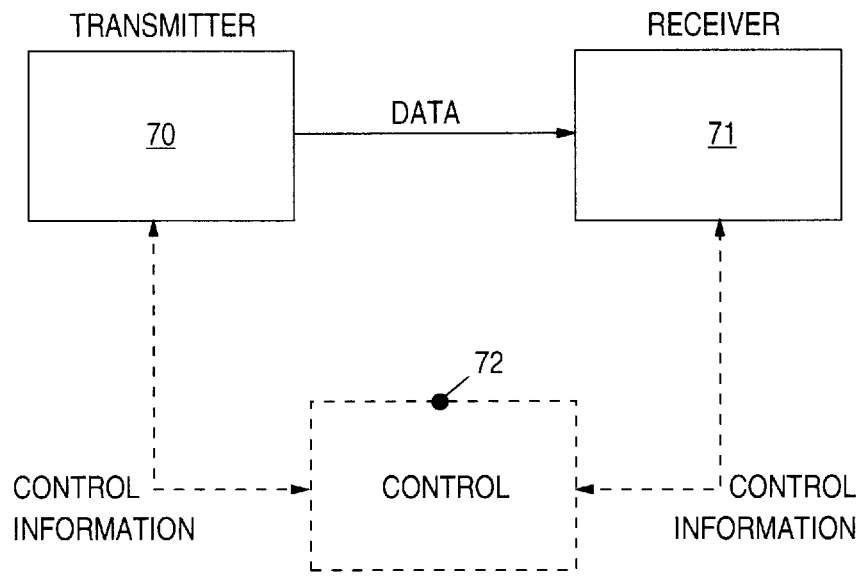
FIGS. 7A–7B depict block diagrams for different architectures of wireless optical communication systems comprising a transmitter/receiver pair and control means for optical power and/or data rate.
Figure 7B:
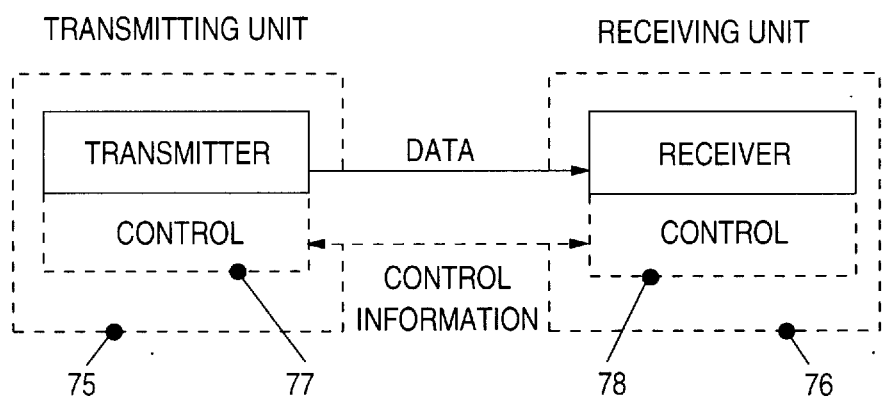

The block diagrams in FIG. 7 show how such control processes could be organized in general. A control system might act as an independent system 72 which interacts with the transmitter 70 and the receiver 71 for setting data rate and/or optical power (FIG. 7A). Input parameters for the control system might be a measure for the signal-to-noise-ratio of the receiver 71 or signals from detectors which characterize the ambient light. In accordance with this invention the information between the control system 72 and transmitter 70 and receiver 71 could be transferred via wireless optical communication. In this case the receiver must comprise an additional optical transmitter and the transmitter has to comprise an additional optical receiver. Another realization of the same inventive concept is the integration of the control function (77, 78) into the transmitting unit and the receiving unit itself (FIG. 7B). The transmitting and the receiving unit can exchange all information about data rate and/or optical power in a hand shake process. Again, wireless optical communication is an adequate method for this procedure in accordance with this invention.

Figure 8:
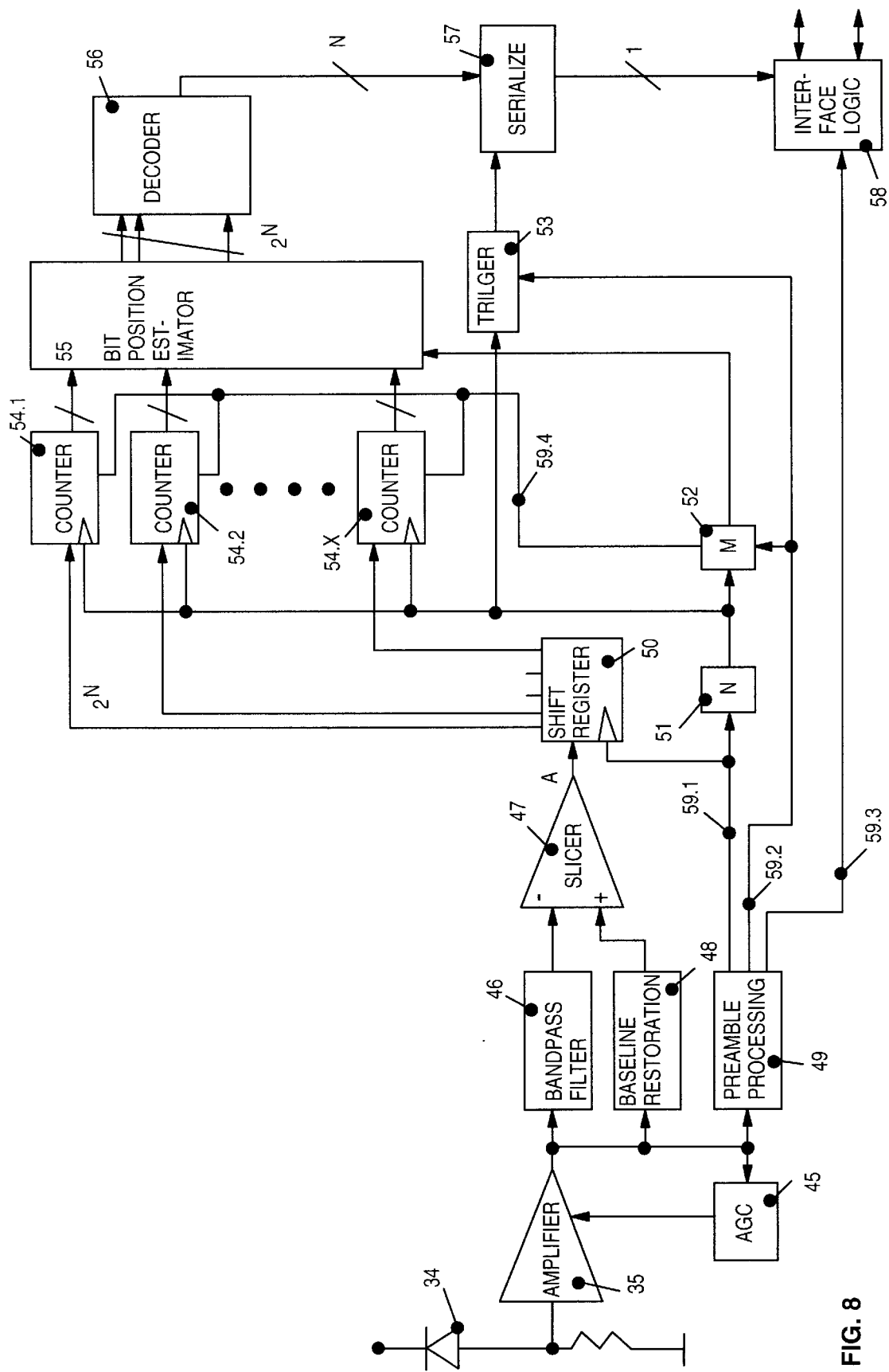
FIG. 8 shows an implementation of an optical receiver suited for the adaptation of the data rate. As an example a special design for signals which are encoded by pulse position modulation (PPM) is shown.

In the following, a receiver which is in accordance with the present invention is described. The receiver is illustrated in FIG. 8. An example for the synchronization of transmitter and receiver is also given below.

As data encoding scheme, Pulse Position Modulation (PPM) is assumed, i.e. the data stream is split up into a sequence of packets. Each packet defines a sequence of time frames of duration $T_2$. By definition, n bits are represented by m equivalent pulses each of them being related to one of m subsequent time frames, having the duration $T_p = T_2/2^n$ and being identified by one of $2^n$ possible equidistant positions within each time frame. This particular definition of PPM-encoding includes the possibility of repeating the same information, encoded by the position of a single pulse with respect to one time frame, m times. Thus, in the general case $m \geq 1$ the data rate, i. e. the number of transmitted bits per time of transmission, is given by $$R_b = \frac{n}{mT_2} \quad (11)$$

A reasonable compromise between the requirement of transmitting pulses without significant distortion and suppressing noise as much as possible is found for setting the receiver bandwidth $B \simeq 1/T_p$.

In this type of encoding, the possibilities for changing the data rate are at least threefold. On the one hand, the number n of bits per time frame and thus $T_2$ can be changed in combination with the optical output power of the transmitter. However, in many cases the application of this approach is limited due to power efficiency considerations. Often it is desired to achieve the highest signal possible. In this case, it is useful to operate the light source of the transmitting unit at the highest power levels which are compatible with safety restrictions and the limits of the device performance. Usually upper limits for the average and the peak of the optical power must be defined. Therefore, also the number n of bits related to a single time frame has an upper limit. Performance data of typical known LEDs suggest to choose n=4 and $T_p \simeq 250$ ns for a transmission with the data rate 1 Mbps. A second approach is affecting the noise level by changing the receiver's bandwidth B in combination with the pulse duration $T_p$ according to the relation given above. Third, if B and $T_p$ are fixed, the transmission of each time frame can be repeated m times within a single packet, thus reducing the data rate by 1/m with respect to the case m=1. Digital signal processing of the received m equal frames, as described later, will decrease the bit error rate.

The receiver illustrated in FIG. 8 comprises an optoelectronic receiver with photodiode 34. The received optical signal is converted to an electrical signal which is fed to the amplifier 35. An optional gain control circuit 45 (AGC) might be employed in order to keep the amplitudes at the output of the amplifier 35 constant. A bandpass filter 46 provides a bandpass-filtered signal (with bandwidth~B) which is fed to a slicer 47. Means 48 for baseline restoration are provided to extract the baseline signal from the signal at the output of amplifier 35. This baseline signal forwarded from the means 48 for baseline restoration to said slicer 47 is not constant due to ac coupling. Hard decisions on detected pulses (true pulses or noise) are clocked into a shift register 50. The shift register 50 has $2^n$ cells in order to contain one frame length. The clock signal $\phi_P$ for triggering said register 50 is generated using means 49 for preamble processing. For enabling transmitter/receiver synchronization and proper processing of received data, a sequence of preamble bits, which carries signals for the synchronization of the system clock and for the synchronization of the time frame $T_2$ and delivers encoded information about the data rate (i.e. n and m), is transmitted at the beginning of each data packet. The preamble processor 49 provides signals for clock extraction 59.1, frame synchronization 59.2, data rate detection 59.2, and carrier sensing 59.3. The means 49 for preamble processing are assumed to deliver clock pulses $\phi_P$ starting at the beginning of the first frame of the preamble.

The shift register 50 provides $2^n$ output signals forwarded to counters (flip flops) 54.1 through 54.x. With no errors, only one counter will contain the detected pulse in the correct position. With errors, several counters may contain a "pulse". At the end of each frame, the output of the shift register 50 are clocked into said counters 54.1–54.x., triggered by a counter clock $\phi_F$ obtained from a first divider 51. This first divider 51 divides the clock pulse $\phi_P$ by $2^n$.

In case of transmission at highest speed, i.e. with m=1, all frames are only transmitted once. The contents of the counters 54.1–54.x are then transferred to means 55 for bit position estimation with a clock $\phi_{MF}$. The bit position estimator 55 makes an attempt to relate a detected pulse to its position with respect to its corresponding time frame $T_2$. The clock $\phi_{MF}$ is equal to $\phi_F$ except a phase shift. After having the contents of the counter transferred to the bit position estimator 55, the counters are reset by a signal provided at an output of a second divider 52. If no error occurred, only one counter contains the pulse count "1" and all others "0". In other words, the bit position estimator delivers a measure of the signal-to-noise ratio of the receiver and, equivalently, the bit error rate. From the results of the bit position estimation, the transmitted data are extracted by the decoder 56, and serialized by means 57 which receives trigger signals from means 53. The interface logic 58 makes the received data available for sub sequent data processing.

In case of repeated transmission, e.g. with m=10, 100, or 1000, with each clock $\phi_F$ the counters are incremented by the contents of the shift register 50. Here the clock signal provided by said second divider 52 is $\phi_{MF}=\phi_F/m$, i.e. this divider divides the clock signal by m. After m frames, the contents of the counters are transferred to said means 55 for bit position estimation. Then, the counters are reset by a trigger signal 59.4 generated by divider 52. In this way, the counters perform signal averaging of $2^n$ samples of the optical signal received during one time frame $T_2$. Thus, they deliver a sampled signal whose signal-to-noise ratio is improved by a factor $1/\sqrt{m}$.

For adapting the data rate by electrical filtering, the adjustment of the width of the bandpass filter of the receiver is required. For this purpose, adjustable analog or digital filters are needed. The pulse lengths are much longer at low data rates such that the power of the transmitter's light source (e.g. a LED) must be reduced to prevent overheating. It is a disadvantage of this method that data rates below about 500 kHz are not possible. This part of the frequency spectrum must be completely suppressed to eliminate the dominant noise contribution due to fluorescent lamps.

According to this invention, the receiver described above can be used in a wireless optical communication system with adaptive data rates in the following way. PPM encoding is chosen. It is assumed that the parameters m and n, i.e the number of repetitions of each time frame and the number of bits per time frame, respectively, are taken as control parameters for the data rate in addition to the optical power of the transmitter. As mentioned above, all information about clock and frame synchronization and the data rate are contained in the sequence of preamble bits of each data packet. Furthermore, synchronization of clock and frame and proper data processing in accordance with predefined values for m and n is controlled by the preamble processor 49. Starting from these prescriptions, a control means in accordance with this invention is described. As an example, the system architecture shown in FIG. 7B is used, i. e. the control function is distributed between the transmitter and the receiver. For the exchange of control data, wireless optical communication is used, i. e. the transmitting unit of the system comprises a receiver as shown in FIG. 8, and the receiving unit of the system comprises an optical transmitter which might be of the same type as the one in the transmitting unit of system. Since all information related to the synchronization of the transmitting and receiving system units is included in the communication protocol, namely the preamble bit sequence, only a reasonable sequence of control steps needs to be defined for establishing a synchronization and optimization procedure on the basis of a handshake mechanism, which can be organized by independent processors in the transmitting and the receiving systems units.

One possible handshake procedure works as follows. At the beginning of a communication process, predefined values for the control parameters—namely m, n and the optical power of the transmitters—are chosen, m and n being known to the control processors of the transmitting system unit and the receiving system unit as well. It is reasonable to start a transmission of test signals at a low default data rate in order to realize signals with a reasonable signal-to-noise ratio which allows for unmistakable optimizing steps. As test signals, the preamble bit pattern of the first data packet to be transmitted could be used. As a result of this first attempt to start a communication process, the receiver, especially its bit position estimator and its decoder, delivers a measure of the actual signal-to-noise ratio and the bit error rate. Taking these data, the control processor of the receiving system unit determines whether these data are between predefined limits and whether there is room for improvement for the data rate and/or the optical output power of the transmitter. The rules according to which a new set of the adaptable control parameters is taken, can be given by mathematical relations which might be determined experimentally or by means of modelling calculations. In a reverse process, the control processor of the transmitting unit expects information about possible improvements being transmitted from the receiving unit, and reacts with the command for the continuation of the synchronization process using a new set of values for the control parameters. If no response from the receiver appears, the transmitting unit might make an attempt to establish communication by subsequently decreasing the transmission rate and thus improving the signal-to-noise ratio. This procedure stops either after having determined an optimized set of control parameters or after having found that communication is impossible within the degrees of freedom of the system. If the communication is established once, the receiving unit can send a request for changing the control parameters whenever the signal-to-noise ratio changes, and the transmitting unit reacts accordingly.

A further degree of freedom for changing the data rate can be introduced by allowing for switching between different coding schemes. Starting from the PPM-based system described above and assuming a given pulse duration $T_p$ and time frames with given duration $T_2$, the data rate can be increased by adding additional pulses to each time frame, thus increasing the number of bits which are related to a single time frame with $T_2/T_p$ possible pulse positions. Due to limitations of the average output power of the transmitting unit, the adding of additional pulses might require a reduction of the peak power. In order to realize this approach the PPM-based system described above must be modified. First, the preamble bit pattern of each packet must include information about the coding scheme used. Second, the preamble processor 49 must be modified for being enabled to handle the preamble. Furthermore, the information about the proper coding scheme must be forwarded to the decoder 56 whose function must depend on the coding scheme. The same holds for the bit position estimator if its content is used for the estimation of the signal-to-noise ratio and/or the bit error rate.

In conclusion, based on analyses of the data throughput, a method and an apparatus for wireless optical communication with adaptive data rates and/or levels of optical output power is proposed which allows for optimizing the data throughput for a particular distance and ambient light environment. In accordance with the present invention full network connectivity within a prescribed range (e.g. 10×10 m) can be maintained at the expense of (often temporarily) reduced throughput. A low data rate, e.g. 0.01 Mbps, may still be sufficient for connecting peripheral devices such as printers 22, modems, keyboards 21 etc. to remote units 20, 23, 24, 25, as illustrated in FIGS. 1A and 1B. In addition, obstructions of the propagation path (for instance by a person obscuring the photodiode of a receiver) can be taken into account by transient resorting to a lower data rate if necessary. Experiments have shown that a person standing 30 cm away from a receiver can cause a 5 dB to 7 dB optical power drop (tilted transmitter/receiver configuration located at desktop level in opposite corners of a 10 m×10 m room). While full network connectivity is maintained due to the present invention even in 'normal' adverse conditions, the user may only notice a graceful degradation in throughput instead of an abrupt communication cutoff.

When employing the present invention in an IR network with repeater which retransmits correctly received data packets, as illustrated in FIG. 1D, the overall network throughput can be increased. Alternatively, one or several participating units (stations) may be configured to retransmit packets not addressed to themselves. As an example (see FIG. 5), a packet transmitted from a transceiver of a first unit at 0.1 Mbps can reach the transceiver of another unit—exposed to direct sunlight—and being separated some 7–10 meters from the first unit, resulting in a throughput of ≈1%. With a repeater station inbetween, the full 10 Mbps rate can be maintained resulting in a throughput of ≈50% (packet transmitted twice). The repeater concept is also suited to increase the overall network range which is important in large offices, for example.

I claim:

1. A wireless optical communication system for data transmission with at least one transmitting unit for radiating modulated optical signals and at least one receiving unit for receiving said optical signals, characterized by control means comprising:

means to determine an optimized set of control parameters based on information reflecting the actual bit error rate provided by said receiving unit, means for facilitating the optical wireless exchange of control data between said receiving unit and transmitting unit, and means for dynamic adaptation of the data rate of said data transmission to ensure that said actual bit error rate does not exceed a predefined upper limit.

2. The communication system of claim 1, wherein the control means comprises at least one processor which receives information about said bit error rate of the data transmission from the receiving unit.

3. The communication system of claim 2, wherein the receiving unit comprises a transmitter for optical signals and the transmitting unit comprises a receiver for optical signals for exchanging said control data between said receiving unit and transmitting unit via wireless optical communication.

4. The communication system of claim 1, wherein the control means comprise at least two processors, one being part of the transmitting unit and one being part of the receiving unit, both communicating with each other for setting the data rate of the data transmission in an interactive process based on said control data exchanged.

5. The communication system of claim 4, wherein the processors communicate via bidirectional wireless optical communication.

6. The communication system of claim 1, wherein the control means includes at least one optical detector, which is used for determining the intensity of ambient light.

7. A wireless optical communication system for data transmission comprising:

at least one transmitting unit for radiating modulated optical signals, at least one receiving unit for receiving said optical signals, the recieving unit having a detector for optical radiation which converts optical signals to electrical signals; an amplifier and a bandpass filter for said electrical signals; a signal averager which periodically samples incoming electrical signals during a time frame of a predefined duration $T_1$, and superposes said sampled signals of subsequent time frames m times, where m is a predefined integer; and a decoding system for the extraction of the data from the signals after being processed by the signal averager, and a control means having a means to determine an optimized set of control parameters based on information reflecting the actual bit error rate provided by said receiving unit, means for facilitating the optical wireless exchange of control data between said receiving unit and transmitting unit, and a means for dynamic adaptation of the data rate of said data transmission to ensure that said actual bit error rate does not exceed a predefined upper limit, the control means at least two processors, one being part of the transmitting unit and one being part of the receiving unit, both communicating with each other for setting the data rate of the data transmission in an interactive process based on said control data exchanged wherein the processors communicate via bidirectional wireless optical communication.

8. The communication system of claim 7, wherein the data rate is adapted by modifying the time per pulse $T_p$ in combination with the corresponding modification of the electrical bandwidth B of the receiver in accordance with $B \approx 1/T_P$.

9. The communication system of claim 8, wherein the data are split into subsets which are transmitted with k subsequent repetitions, where k is a predefined integer $\geq 1$ and each subset has a predefined duration $T_2$.

10. The communication system of claim 9, wherein the data rate is adapted by changing the number k of said repetitions according to predefined rules; and the signal averager and the decoding system are synchronized to the transmission of the packets, $T_1 \geq T_2$ and k=m.

11. The communication system of claim 10, wherein each subset carries n bits which are coded by pulse position modulation (PPM) within the duration $T_2$, the receivers have means for decoding PPM-coded data.

12. The communication system of claim 11, wherein the data rate is adapted by changing n in combination with an adjustment of the optical power of the transmitting unit.

13. A method for wireless optical data communication between at least one transmitting unit and at least one receiving unit, comprising the steps of, radiating optical signals from said transmitting unit;

detecting said optical signals by the receiving unit;

determining an optimized set of control parameters based on information reflecting the actual bit error rate of the transmission, optically exchanging control data between said receiving unit and transmitting unit, and dynamically adjusting the data rate of the transmission to ensure that said actual bit error rate does not exceed a predefined upper limit.

14. A method for wireless optical data communication between at least one transmitting unit and at least one receiving unit, comprising the steps of:

radiating optical signals from said transmitting unit;

detecting said optical signals by the receiving unit;

determining an optimized set of control parameters based on information reflecting the actual bit error rate of the transmission, optically exchanging control data between said receiving unit and transmitting unit, and dynamically adjusting the data rate of the transmission to ensure that said actual bit error rate does not exceed a predefined upper limit converting the detected optical signals to electrical signal;

amplifying and filtering said electrical signals;

sampling said electrical signals during a time frame of predefined duration $T_1$;

averaging said sampled signals related to m subsequent time frames, m being an integer, and decoding said electrical signals.

15. The method of claim 14, wherein the step of adjusting the data rate comprises the step of modifying the time per pulse $T_P$ in combination with changing the bandwidth B of the receiver in accordance with $B \simeq 1/T_P$.

16. The method of claim 15, wherein the data transmission is based on the steps of splitting up the data in subsets of duration $T_2$ and transmitting each subset with k subsequent repetitions, k being $\geq 1$.

17. The method of claim 16, comprising the steps of adapting the data rate by changing the number k of the repetitions according to predefined rules, synchronizing the time frames for the sampling of signals with the subsets, and averaging the sampled signals of m equivalent time frames.

18. The method of claim 17, wherein the data transmission entails the coding of n bits, n being an integer, by pulse position modulation (PPM) within each subset.

19. The method of claim 18, comprising the step of adapting the data rate by changing n in combination with an adjustment of the optical power of the transmitting unit.

20. A receiving unit for use in a wireless optical communication system comprising:

a receiver for optical signals, means to determine the actual bit error rate, means facilitating the optical wireless exchange of control data between said receiving unit and a remote transmitting unit, and means to interactively determine an optimized set of control parameters taking into account information reflecting said actual bit error rate.

21. A receiving unit for use in a wireless optical communication system comprising:

a receiver for optical signals;

means to determine the actual bit error rate;

means facilitating the optical wireless exchange of control data between said receiving unit and a remote transmitting unit;

means to interactively determine an optimized set of control parameters taking into account information reflecting said actual bit error rate;

a detector for optical radiation which converts optical signals to electrical signals;

an amplifier and a bandpass filter for said electrical signals;

a signal averager which periodically samples incoming electrical signals during a time frame of a predefined duration $T_1$, and superposes said sampled signals of subsequent time frames m times, where m is a predefined integer; and a decoding system for the extraction of the data from the signals after being processed by the signal averager.

* * * * *